(12) United States Patent
Yamane (10) Patent No.: US 7,195,200 B2
(45) Date of Patent: Mar. 27, 2007

(54) UNMANNED HELICOPTER, TAKEOFF METHOD OF UNMANNED HELICOPTER, AND LANDING METHOD OF UNMANNED HELICOPTER

(75) Inventor: Akihiro Yamane, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 205 days.

(21) Appl. No.: 10/679,984

(22) Filed: Oct. 6, 2003

(65) Prior Publication Data
US 2004/0075018 A1  Apr. 22, 2004

(30) Foreign Application Priority Data
Oct. 8, 2002 (JP) .............................. 2002-295174

(51) Int. Cl.
    *B64C 13/16* (2006.01)
(52) U.S. Cl. .................. 244/76 R; 244/183; 244/186; 244/195; 244/180; 244/17.13; 701/15; 701/16; 701/18
(58) Field of Classification Search .............. 244/180, 244/181, 183, 186, 195, 76 R, 17.13; 701/15, 701/16, 18, 11
See application file for complete search history.

(56) References Cited

U.S. PATENT DOCUMENTS

| | | | |
|---|---|---|---|
| 3,096,045 A * | 7/1963 | Hendrickson et al. | ... 244/17.11 |
| 3,096,046 A * | 7/1963 | Kendall, Jr. et al. | ..... 244/17.13 |
| 3,697,022 A * | 10/1972 | Autechaud et al. | ...... 244/17.13 |
| 5,252,100 A * | 10/1993 | Osawa et al. | .................. 446/44 |
| 5,446,666 A | 8/1995 | Bauer | |
| 5,716,032 A | 2/1998 | McIngvale | |
| 5,765,783 A * | 6/1998 | Albion | ........................ 244/7 B |
| 6,189,836 B1 * | 2/2001 | Gold et al. | .................. 244/191 |
| 6,198,991 B1 * | 3/2001 | Yamakawa et al. | ........... 701/16 |
| 6,474,603 B1 * | 11/2002 | Kinkead et al. | ............. 244/195 |
| 6,527,225 B1 * | 3/2003 | Silder et al. | .............. 244/76 R |

FOREIGN PATENT DOCUMENTS

| | | |
|---|---|---|
| GB | 776 963 A1 | 6/1957 |
| JP | 2000-118498 A1 | 4/2000 |

OTHER PUBLICATIONS

Patent Abstracts of Japan; vol. 2000, No. 07, Sep. 29, 2000 & JP 2000 118498 A (Yamaha Motor Co Ltd), Apr. 25, 2000, *abstract*.

(Continued)

*Primary Examiner*—J. Woodrow Eldred
(74) *Attorney, Agent, or Firm*—Darby & Darby (57) ABSTRACT

An unmanned helicopter includes an altitude control device for giving a command of a collective pitch blade angle based on an altitude change rate command, etc., and performing altitude control of an airframe and takeoff device, upon reception of a takeoff start command from the ground, for causing the airframe to take off and climbing the airframe to a first altitude while increasing the collective pitch blade angle without performing the altitude control of the altitude control device and then causing the altitude control device to start the altitude control. The unmanned helicopter further includes descending device for causing the airframe to descend to a second altitude while changing descent rate command of the altitude control device and giving a descent rate command smaller than the descent rate command to the second altitude to the altitude control device for causing the airframe to descend from the second altitude to the ground.

11 Claims, 5 Drawing Sheets

OTHER PUBLICATIONS

Patent Abstracts of Japan; vol. 1996, No. 06, Jun. 28, 1996 & JP 08 048297 A (Japan Aviation Electron Ind Ltd), Feb. 20, 1996, *abstract*.

Patent Abstracts of Japan; vol. 017, No. 123, Mar. 15, 1993 & JP 04 306198 A (Fuji Heavy Ind Ltd), Oct. 28, 1992, *abstract*.

* cited by examiner

UNMANNED HELICOPTER, TAKEOFF METHOD OF UNMANNED HELICOPTER, AND LANDING METHOD OF UNMANNED HELICOPTER

BACKGROUND OF THE INVENTION

This invention relates to an unmanned helicopter, a takeoff method of an unmanned helicopter, and a landing method of an unmanned helicopter.

At present, various arts of autonomously flying an unmanned helicopter are developed in various industrial fields. For example, a flight control system is proposed wherein a predetermined control command is transmitted from a personal computer installed on the ground through a predetermined transmitter to a microcomputer installed in an airframe and the microcomputer performs drive control of a rotor and a control surface of the airframe based on the control command, thereby making possible an autonomous flight. (For example, refer to patent document 1.)

The Unexamined Japanese Patent Application Publication No.2000-118498 (page 1, FIG. 1)

However, in the flight control system in the related art as described in patent document 1, when an airframe takes off the ground or is landed, radio remote control operation of a ground operator is required; a flight control system for making a completely autonomous flight from takeoff to landing is not yet in the actual use as things stand now.

The reason why automatic takeoff and landing control of an airframe is not realized is that the following technical and practical problems exist:

To begin with, a technical problem involved in takeoff will be discussed. Since the attitude angle of an airframe is unbalanced in a touchdown state, the attitude angle needs to be balanced as soon as possible just after takeoff. Usually, the airframe is designed so that the attitude of the airframe becomes almost stable without attitude control, and thus the attitude of the airframe does not rapidly become unstable just after takeoff. However, the airframe may start motion in a lateral direction at the same time as takeoff because of a delicate imbalance of the attitude angle. At this time, if a foot is caught in the ground, the airframe may roll in some cases. To avoid such a situation, the airframe needs to be climbed and brought away from the ground as soon as possible while the attitude of the airframe is stabilized just after takeoff.

Figure 3:
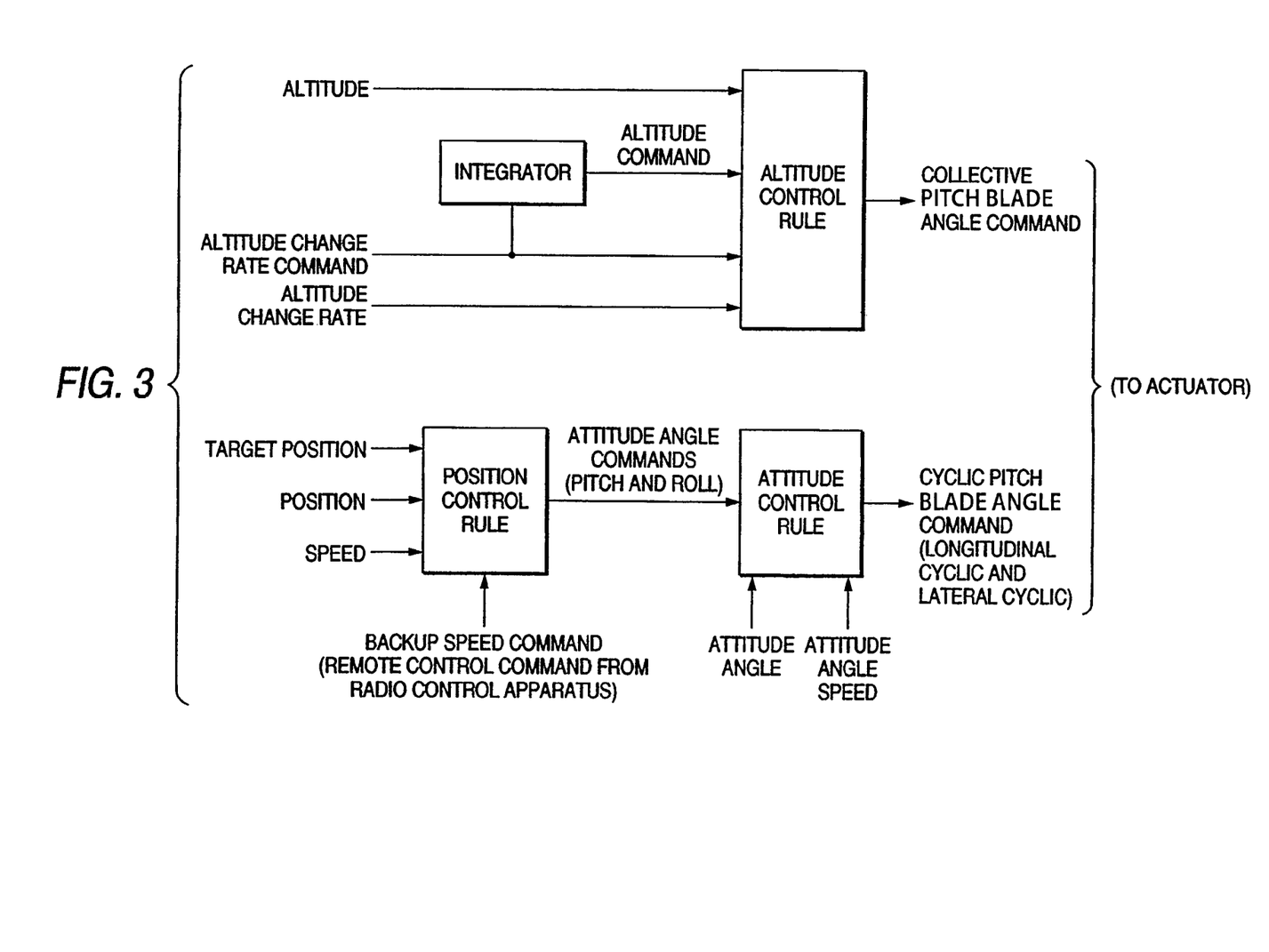
FIG. 3 is a block diagram to describe altitude control, position control, and attitude control of the unmanned helicopter in the flight control system according to the embodiment of the invention.

To climb the airframe, the collective pitch blade angle needs to be changed to control the thrust of a main rotor. Hitherto, an altitude control rule of detecting the altitude and feeding back the altitude and changing the collective pitch blade angle based on the deviation between the altitude and a predetermined altitude command (target altitude) is adopted for controlling the thrust of the main rotor, as shown in FIG. 3. A collective pitch blade angle command to cause the main rotor to produce the thrust for supporting the weight of the airframe is calculated by an integrator (not shown), etc., of the altitude control rule in FIG. 3.

However, in the altitude control rule, it is common practice to set the integration gain to a small value for the purpose of stabilizing the control system. Thus, when controlling the thrust of the main rotor is started, if the initial value of the integrator (not shown) in the altitude control rule in FIG. 3 is preset to zero, it takes time until a balance between the thrust of the main rotor and the weight of the airframe is struck.

That is, if the altitude control rule in the related art is adopted for controlling the thrust of the main rotor, the airframe cannot be promptly brought away from the ground and therefore an unstable state before the attitude of the airframe is stabilized continues for a given time in the proximity of the ground; there is a problem in safety.

Next, a practical problem involved in landing will be discussed. To realize safe landing of an airframe, the descending speed at the landing time needs to be sufficiently lessened. On the other hand, to ensure operability, it is desirable that the required time from start of descending to landing should be shortened as much as possible. To meet both the requirements, there is an idea of separately constructing a "landing-dedicated control system" different from altitude control at usual autonomous flight.

However, constructing such a separate landing-dedicated control system inevitably results in complication of the software configuration. To lessen the descending speed at the landing time, special high-accurate sensors for measuring the altitude and the descending speed need to be installed in the airframe. Therefore, if an attempt is made to construct a landing-dedicated control system, it costs to develop new software and install high-accurate sensors, resulting in an increase in the airframe price; this is a problem.

SUMMARY OF THE INVENTION

It is an object of the invention to accomplish safe automatic takeoff and landing and suppress a cost increase to construct a control system in an unmanned helicopter for making an autonomous flight without needing any operation command from the ground.

It is an object of the invention to provide an unmanned helicopter takeoff method for accomplishing safe automatic takeoff and an unmanned helicopter landing method for accomplishing safe automatic landing.

To the ends, according to the invention as in the first aspect, there is provided an unmanned helicopter for making a flight autonomously, the unmanned helicopter including altitude control device for giving a command of a collective pitch blade angle based on the deviation between a fed-back altitude and an altitude command and the deviation between a fed-back climb rate and a climb rate command; position control device for performing position control based on the deviation between a fed-back position and a position command with respect to a horizontal position and the deviation between fed-back speed and a speed command; attitude control device for performing attitude control of an airframe based on the deviation between a fed-back attitude angle and an attitude angle command; and takeoff device, upon reception of a takeoff start command from the ground, for causing the airframe to take off and climbing the airframe to a first altitude while increasing the collective pitch blade angle without performing the altitude control of the altitude control device and then causing the altitude control device to start the altitude control.

According to the invention as in the first aspect, the helicopter includes the takeoff device, upon reception of a takeoff start command from the ground, for causing the airframe to take off and climbing the airframe to the first altitude while increasing the collective pitch blade angle without performing the altitude control of the altitude control device and then causing the altitude control device to start the altitude control, so that the airframe can be promptly brought away from the ground. Consequently, continuation of an unstable state before the attitude of the airframe is stabilized for a given time in the proximity of the ground can be circumvented and safety at the takeoff time can be ensured. Moreover, the takeoff device controls the operation timing of the altitude control device used previously, so that the software configuration is comparatively simple. Consequently, an increase in the airframe price can be suppressed.

The invention as in the second aspect is characterized by the fact that in the unmanned helicopter as in the first aspect, the takeoff device suppresses the position control and the attitude control when climbing the airframe to the first altitude.

According to the invention as in the second aspect, the takeoff device suppresses the position control and the attitude control when climbing the airframe to the first altitude. Thus, if the airframe is restrained by the friction between the foot and the ground in the touchdown state and cannot follow the attitude angle command, an excessive control command can be prevented from being output for causing the airframe to topple over.

According to the invention as in the third aspect, there is provided an unmanned helicopter for making a flight autonomously, the unmanned helicopter including altitude control device for controlling a collective pitch blade angle based on a blade angle command calculated based on the deviation between a fed-back altitude and an altitude command and the deviation between a fed-back descent rate and a descent rate command; position control device for performing position control based on the deviation between a fed-back position and a position command with respect to a horizontal position and the deviation between fed-back speed and a speed command; attitude control device for performing attitude control of an airframe based on the deviation between a fed-back attitude angle and an attitude angle command; and descending device for stepwise changing descent rate command of the altitude control device for causing the airframe to descend to a second altitude and giving a descent rate command smaller than the descent rate command to the second altitude to the altitude control device for causing the airframe to descend from the second altitude to the ground.

According to the invention as in the third aspect, the unmanned helicopter includes the descending device for stepwise changing descent rate command of the altitude control device for causing the airframe to descend to the second altitude and giving a descent rate command smaller than the descent rate command to the second altitude to the altitude control device for causing the airframe to descend from the second altitude to the ground, so that the descending speed at the landing time can be lessened sufficiently. Consequently, safety at the landing time can be ensured.

Moreover, the descending device performs control related to the descent rate command of the altitude control device used previously, so that the software configuration is comparatively simple. Special high-accurate sensors for measuring the altitude and the descending speed in the proximity of the ground need not be installed in the airframe and a commercially available general-purpose differential GPS can be installed for controlling the descending speed at the landing time to sufficiently small speed. Consequently, an increase in the airframe price can be suppressed.

The invention as in the forth aspect is characterized by the fact that in the unmanned helicopter as in the third aspect, the descending device suppresses the position control and the attitude control when causing the airframe to descend from the second altitude to the ground.

According to the invention as in the forth aspect, the descending device suppresses the position control and the attitude control when causing the airframe to descend from the second altitude to the ground. Thus, if the airframe is restrained by the friction between the airframe and the ground after landing and cannot follow the attitude angle command, an excessive control command can be prevented from being output for causing the airframe to topple over.

The invention as in the fifth aspect is characterized by the fact that the unmanned helicopter as in the third or the forth aspect further includes landing determination device for determining that the airframe lands if the blade angle command which is less than a predetermined value continues for a predetermined time.

According to the invention as in the fifth aspect, the unmanned helicopter includes the landing determination device for determining that the airframe lands if the blade angle command of a predetermined value or less continues for a predetermined time, so that an erroneous determination of landing can be prevented and safe landing operation can be ensured.

According to the invention as in the sixth aspect, there is provided a takeoff method of an unmanned helicopter including a first climbing step of climbing to a first altitude while increasing a climb rate without performing altitude control; and a second climbing step of climbing while performing altitude control from the first altitude.

According to the invention as in the sixth aspect, the takeoff method includes the first climbing step of climbing to the first altitude while increasing the climb rate without performing altitude control, so that the airframe is promptly brought away from the ground. Consequently, continuation of an unstable state before the attitude of the airframe is stabilized for a given time in the proximity of the ground can be circumvented and safety at the takeoff time can be ensured.

The invention as in the seventh aspect is characterized by the fact that in the takeoff method of an unmanned helicopter as in the sixth aspect, position control of an airframe on a horizontal plane and attitude control of the airframe are suppressed in the first climbing step.

According to the invention as in the seventh aspect, position control of the airframe on the horizontal plane and attitude control of the airframe are suppressed in the first climbing step. Thus, if the airframe is restrained by the friction between the foot and the ground in the touchdown state and cannot follow the attitude angle command, an excessive control command can be prevented from being output for causing the airframe to topple over.

According to the invention as in the eighth aspect, there is provided a landing method of an unmanned helicopter including a first descending step of stepwise decreasing a descent rate and descending to a second altitude; and a second descending step of descending from the second altitude to the ground at a descent rate smaller than the descent rate in the first step.

According to the invention as in the eighth aspect, the landing method includes the first descending step of stepwise decreasing the descent rate and descending to the second altitude; and the second descending step of descending from the second altitude to the ground at a descent rate smaller than the descent rate in the first step, so that the descending speed at the landing time can be lessened sufficiently. Consequently, safety at the landing time can be ensured.

The invention as in the ninth aspect is characterized by the fact that in the landing method of an unmanned helicopter as in the eighth aspect, position control of an airframe on a horizontal plane and attitude control of the airframe are suppressed in the second descending step.

According to the invention as in the ninth aspect, position control of the airframe on the horizontal plane and attitude control of the airframe are suppressed in the second descending step. Thus, if the airframe is restrained by the friction between the airframe and the ground after landing and cannot follow the attitude angle command, an excessive control command can be prevented from being output for causing the airframe to topple over.

According to the invention as in the tenth aspect, there is provided a landing method of an unmanned helicopter including changing a collective pitch blade angle based on a blade angle command calculated based on the deviation between a fed-back altitude and an altitude command and the deviation between a fed-back altitude change rate and an altitude change rate command, descending, and determining that the helicopter lands if the blade angle command of a predetermined value or less continues for a predetermined time.

According to the invention as in the tenth aspect, the collective pitch blade angle is changed based on the blade angle command calculated based on the deviation between the fed-back altitude and the altitude command and the deviation between the fed-back altitude change rate and the altitude change rate command, descending is performed, and if the blade angle command of a predetermined value or less continues for a predetermined time, it is determined that the helicopter lands. Thus, an erroneous determination of landing can be prevented and safe landing operation can be ensured.

DETAILED DESCRIPTION OF THE INVENTION

Referring now to the accompanying drawings, there is shown a preferred embodiment of the invention.

Figure 1:
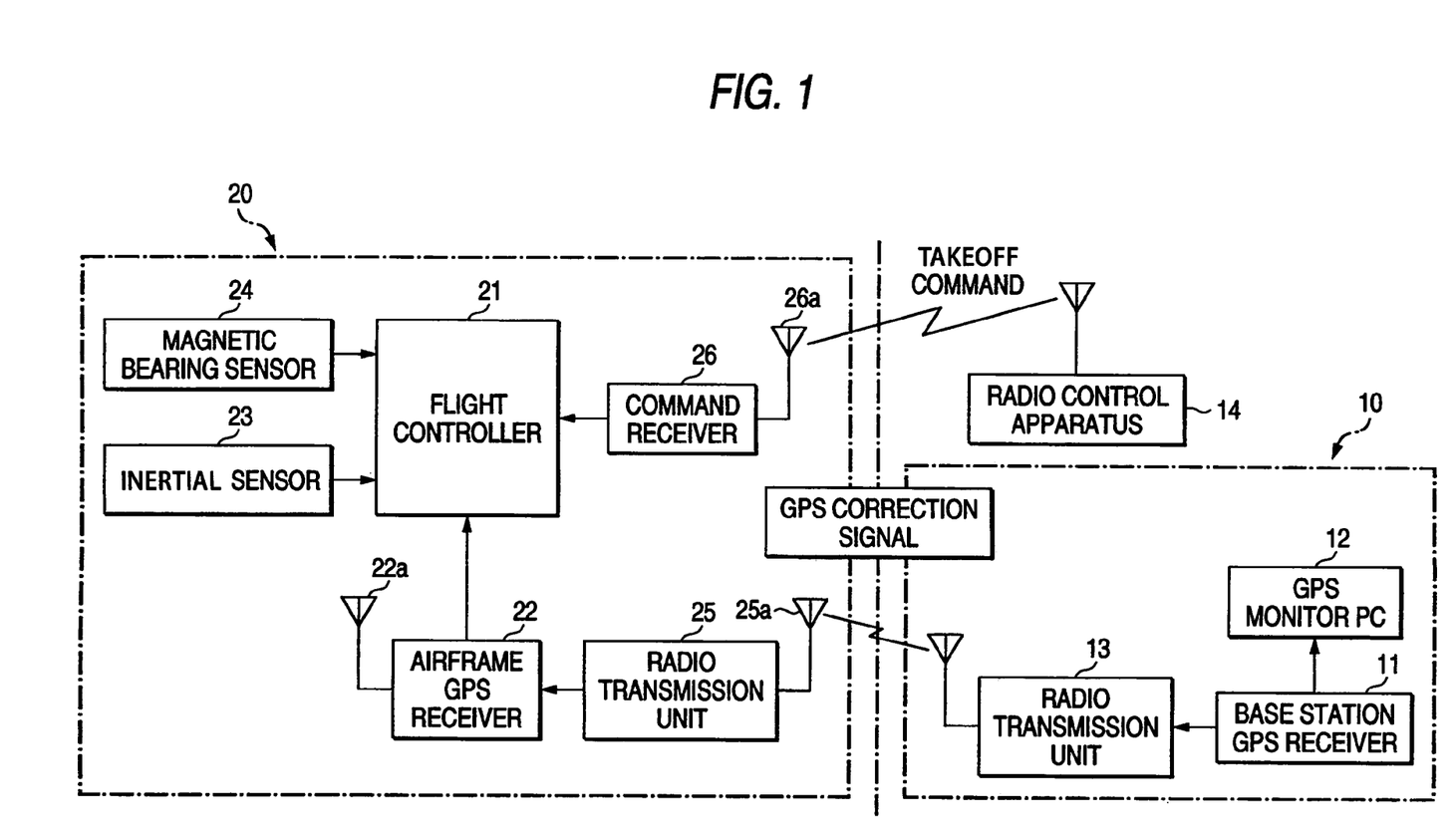
FIG. 1 is a block diagram to describe the configuration of a flight control system according to an embodiment of the invention.
Figure 2:
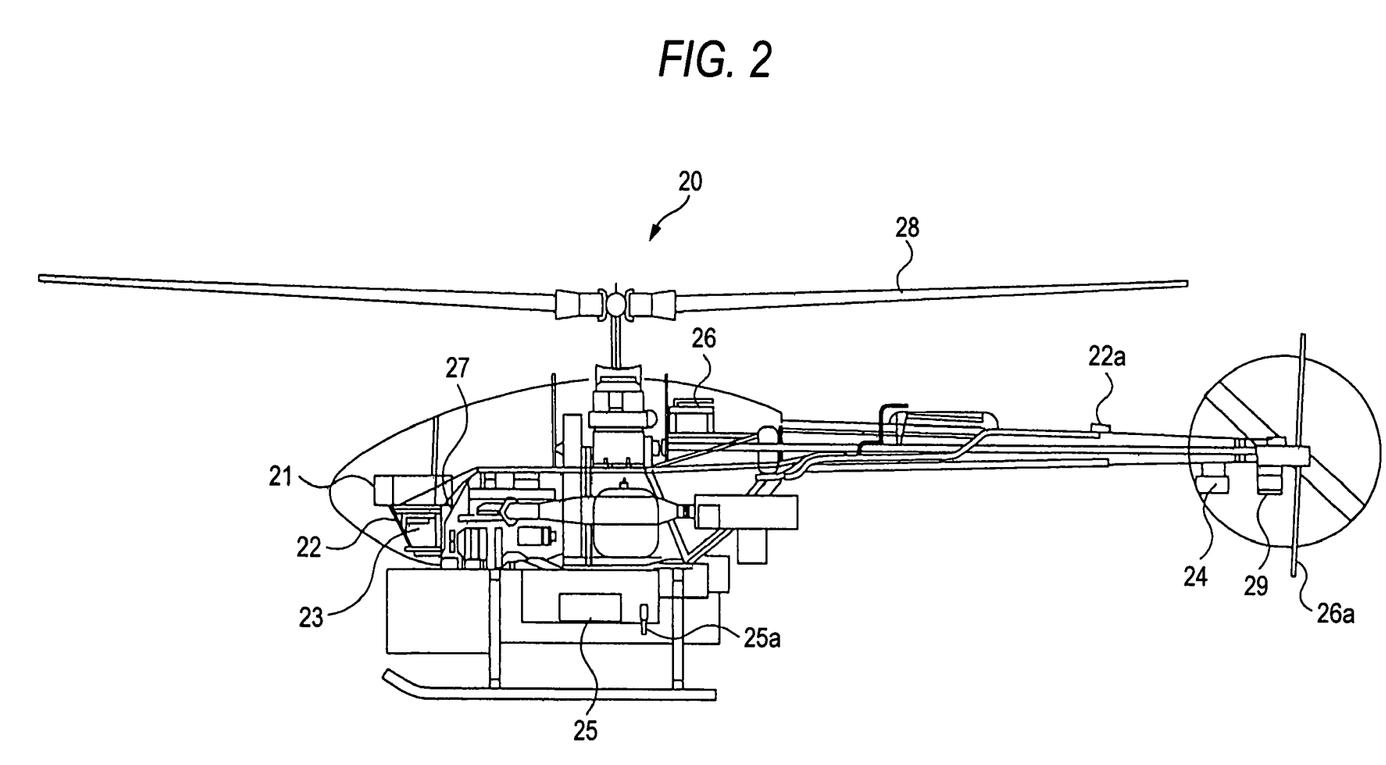
FIG. 2 is a schematic drawing to describe the configuration of an unmanned helicopter in the flight control system according to the embodiment of the invention.

In the embodiment, a flight control system including an unmanned helicopter according to the invention will be discussed. To begin with, the configuration of a flight control system 1 according to the embodiment will be discussed with FIGS. 1 and 2. FIG. 1 is a block diagram to describe the configuration of the flight control system 1. FIG. 2 is a schematic drawing to describe the configuration of an unmanned helicopter 20 in the flight control system 1.

The flight control system 1 according to the embodiment includes a ground system made up of a base station 10 and a radio control apparatus 14 installed on the ground and the unmanned helicopter 20 and performs operation control of the unmanned helicopter 20 based on a predetermined control command transmitted from the radio control apparatus 14.

The base station 10 includes a base station GPS receiver 11 for receiving a signal from a GPS (Global Positioning System) satellite, a personal computer (PC) 12 including a monitor for displaying the GPS reception state, and a base station radio transmission unit 13 for transmitting differential information of the GPS to the unmanned helicopter 20, as shown in FIG. 1. The radio control apparatus 14 transmits a control command such as a takeoff command entered by an operator to the unmanned helicopter 20.

The unmanned helicopter 20 includes a flight controller 21 for performing drive control of a rotor, etc., of an airframe for autonomously flying the unmanned helicopter 20 based on a control command from the ground and a previously stored control command, an airframe GPS receiver 22 for receiving a signal from a GPS satellite and detecting the position, the speed, the altitude, etc., of the airframe, an inertial sensor 23 for detecting the attitude angle and the angular speed of the airframe, a magnetic bearing sensor 24 for detecting the magnetic bearing of the airframe, an airframe radio transmission unit 25 for receiving differential information of the GPS transmitted from the base station radio transmission unit 13, a command receiver 26 for receiving a takeoff start command, etc., transmitted from the radio control apparatus 14, an engine 27, a rotor 28, a warning light 29, etc., as shown in FIGS. 1 and 2.

The flight controller 21 is a microcomputer including an arithmetic processing circuit, memory storing various control programs and various pieces of information required for flight control, and the like; it performs drive control of the engine 27, thereby rotating the rotor 28 for producing upward thrust for moving up and down the airframe.

The airframe GPS receiver 22, the inertial sensor 23, the magnetic bearing sensor 24, and the command receiver 26 are connected to the flight controller 21, as shown in FIG. 1. The flight controller 21 controls the collective pitch blade angle and the cyclic pitch blade angle of the rotor 28 for accomplishing predetermined flight control based on various pieces of data detected by the airframe GPS receiver 22, the inertial sensor 23, and the magnetic bearing sensor 24.

The airframe GPS receiver 22 receives a signal from a GPS satellite through a GPS antenna 22a and calculates position information. The airframe radio transmission unit 25 receives differential information, etc., from the base station radio transmission unit 13 through a radio transmission unit antenna 25a. The differential information is used to correct the position information calculated by the airframe GPS receiver 22. The command receiver 26 receives a takeoff command, etc., from the radio control apparatus 14 through a command reception antenna 26a. The warning light 29 installed in the airframe blinks according to a preset blink pattern, thereby informing the operator of the airframe state.

A predetermined control command transmitted from the radio control apparatus 14 of the base station 10 is transmitted through the command reception antenna 26a and the command receiver 26 to the flight controller 21, which then accomplishes predetermined flight control based on the control command, thereby making it possible to remotely control the unmanned helicopter 20.

Next, the automatic flight control function of the flight controller 21 of the unmanned helicopter 20 in the flight control system 1 according to the embodiment will be discussed with FIG. 3. FIG. 3 is a block diagram to describe altitude control, position control, and attitude control of the airframe. The altitude control, position control, and attitude control are applied at the takeoff time of the unmanned helicopter 20, at the autonomous flight time based on predetermined flight pattern data, and at the landing time, but some control is suppressed in automatic takeoff and landing control operation described later.

<Altitude Control>

To begin with, the altitude control will be discussed. An altitude control program for accomplishing the altitude control is stored in the memory of the flight controller 21. When the arithmetic processing circuit of the flight controller 21 executes the altitude control program, the deviation between the airframe altitude detected and fed back by the airframe GPS receiver 22 and an altitude command (altitude deviation), the integration value of the altitude deviation, and the deviation between the fed-back airframe altitude change rate and an altitude change rate command are calculated and the calculation values are multiplied by a predetermined gain and the results are added, whereby a collective pitch blade angle command of the airframe is calculated. This collective pitch blade angle command is a blade angle command in the invention.

The collective pitch blade angle is controlled in a blade angle drive actuator based on the collective pitch blade angle command, whereby the altitude control of the airframe can be performed. That is, the altitude control program and the arithmetic processing circuit of the flight controller 21 provide altitude control device in the invention.

In the embodiment, a preset altitude change rate command is integrated by the integrator to calculate an altitude command, whereby continuous and smooth altitude control is realized, as shown in FIG. 3. The altitude change rate command in the embodiment is set to a constant value at the takeoff time, a value set based on predetermined flight pattern data in the autonomous flight mode, and a value as stepwise decreased according to altitude data at the landing time. Setting of the altitude change rate commands at the takeoff time and the landing time is described later in detail.

<Position Control and Attitude Control>

Next, the position control and the attitude control will be discussed. A position control program for accomplishing the position control is stored in the memory of the flight controller 21. When the arithmetic processing circuit of the flight controller 21 executes the position control program, the deviation between the airframe position detected and fed back by the airframe GPS receiver 22 and the target position (position deviation) and the integration value of the position deviation are calculated and the calculation values are multiplied by a predetermined gain and the results are added, whereby a speed command in a terrestrial coordinate system is calculated. This speed command in the terrestrial coordinate system is converted into a speed command in an airframe coordinate system and the deviation between the fed-back airframe speed and the speed command in the airframe coordinate system is multiplied by a predetermined gain to calculate airframe attitude angle commands (pitch angle command and roll angle command). The airframe bearing angle detected by the magnetic bearing sensor 24 is used for coordinate conversion from the terrestrial coordinates to the airframe coordinates.

An attitude control program for accomplishing the attitude control is stored in the memory of the flight controller 21. When the arithmetic processing circuit of the flight controller 21 executes the attitude control program, the deviation between the airframe attitude angles (pitch angle and roll angle) detected and fed back by the inertial sensor 23 and the attitude angle commands calculated by the position control program (attitude angle deviation) and the integration value of the attitude angle deviation are calculated and the calculation values are multiplied by a predetermined gain and the results are added. Then, the fed-back airframe attitude angle speed is subtracted from the addition result to calculate a cyclic pitch blade angle command of the airframe.

The longitudinal cyclic pitch blade angle and the lateral cyclic pitch blade angle are controlled in the blade angle drive actuator based on the cyclic pitch blade angle command, whereby the position control and the attitude control of the airframe can be performed. That is, the position control program, the attitude control program, and the arithmetic processing circuit of the flight controller 21 provide position control device and attitude control device in the invention.

In the flight control system 1 according to the embodiment, backup remote control can be performed. That is, when the flight controller 21, etc., fails or to change a speed command, the operator can transmit a predetermined backup speed command from the radio control apparatus 14 to calculate an attitude angle command. (See FIG. 3.)

Figure 4:
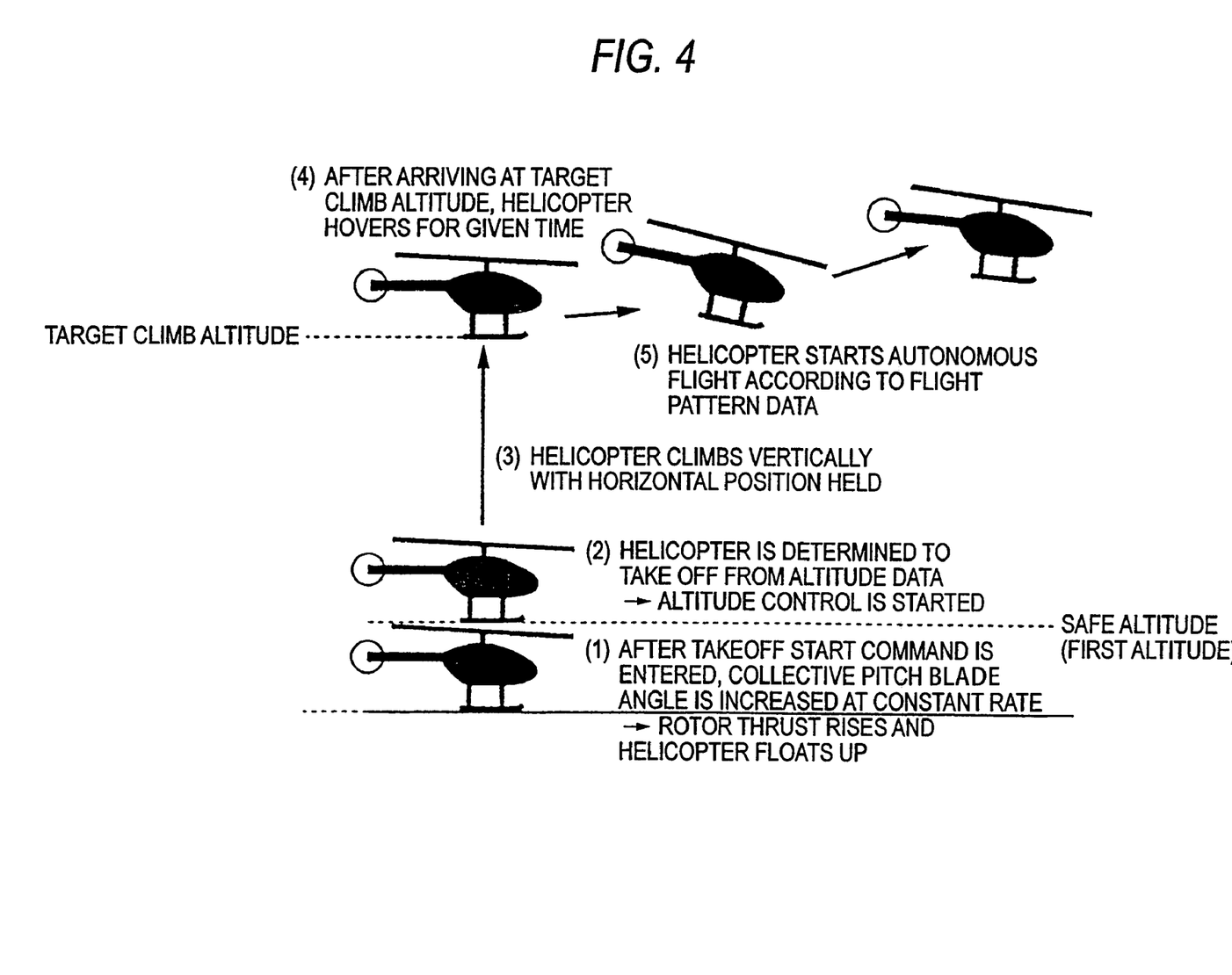
FIG. 4 is a schematic representation to describe automatic takeoff control for accomplishing the automatic takeoff operation of the unmanned helicopter in the flight control system according to the embodiment of the invention.
Figure 5:
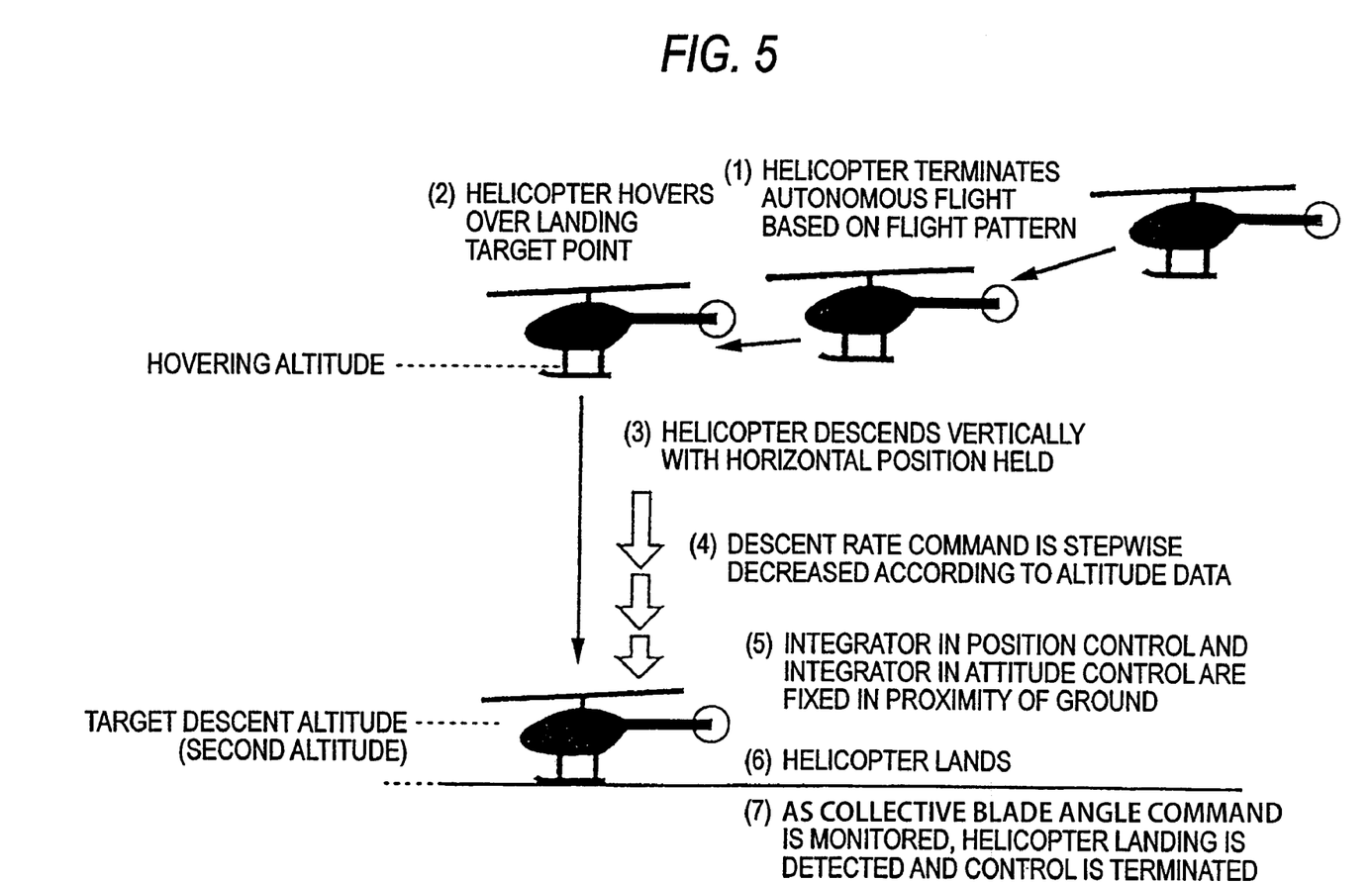
FIG. 5 is a schematic representation to describe automatic landing control for accomplishing the automatic landing operation of the unmanned helicopter in the flight control system according to the embodiment of the invention.

Next, the automatic takeoff and landing control function of the flight controller 21 of the unmanned helicopter 20 in the flight control system 1 according to the embodiment will be discussed with FIGS. 4 and 5. FIG. 4 is a schematic representation to describe automatic takeoff control for accomplishing the automatic takeoff operation of the airframe. FIG. 5 is a schematic representation to describe automatic landing control for accomplishing the automatic landing operation of the airframe.

<Automatic Takeoff Control>

To begin with, the automatic takeoff control will be discussed. A takeoff control program for accomplishing predetermined automatic takeoff operation is stored in the memory of the flight controller 21. Upon reception of a takeoff start command from the radio control apparatus 14, the arithmetic processing circuit of the flight controller 21 executes the takeoff control program. While increasing the collective pitch blade angle command at a constant rate, thereby increasing the climb rate (altitude change rate), the takeoff control program causes the airframe to take off and climbs the airframe to a predetermined safe altitude.

The safe altitude, which is a first altitude in the invention, refers to an altitude at which the airframe is completely brought away from the ground and it is made possible to apply usual altitude control rule. The safe altitude can be set appropriately in response to the weight of the airframe, the weather conditions, the touchdown conditions, etc.; in the embodiment, an altitude of "several 10 centimeters (preferred 30–60 centimeters)" that can be reliably measured by differential GPS (altitude and position measurement device) and is sufficiently low is the safe altitude. The increase rate of the collective pitch blade angle command by the takeoff control program can be set appropriately in response to the weight of the airframe and the weather conditions.

As the takeoff control program is executed, the airframe is caused to take off and can be climbed to the safe altitude while the climb rate is increased at a constant rate, so that the airframe can be promptly brought away from the ground. Consequently, continuation of an unstable state before the attitude of the airframe is stabilized for a given time in the proximity of the ground can be circumvented and safety at the takeoff time can be ensured.

The takeoff control program temporarily suppresses processing of the position control program and the attitude control program while the airframe climbs to the safe altitude. Specifically, as the takeoff control program is executed, input to the integrator (not shown) in the position control rule in FIG. 3 is set to zero and input to the integrator (not shown) in the attitude control rule in FIG. 3 is also set to zero.

As the takeoff control program is executed, processing of the position control program and the attitude control program is temporarily suppressed. Thus, if the airframe is restrained by the friction between the foot and the ground in the touchdown state and cannot follow the attitude angle command, an excessive control command can be prevented from being output for causing the airframe to topple over.

The takeoff control program and the arithmetic processing circuit of the flight controller 21 described above provide takeoff device in the invention. The step of causing the airframe to take off and climbing the airframe to the safe altitude while increasing the climb rate at a constant rate by executing the takeoff control program is a first climbing step in the invention.

If the fact that the airframe arrives at the safe altitude is measured by the airframe GPS receiver 22, the arithmetic processing circuit of the flight controller 21 starts the altitude control program for starting processing thereof and also restarts processing of the position control program and the attitude control program for performing altitude control, position control, and attitude control. (See FIG. 4.)

When the altitude control program is started, the value of the collective blade angle command when the airframe arrives at the safe altitude is used as the initial value of the integrator (not shown) in the altitude control rule in FIG. 3. In the embodiment, the altitude change rate command (climb rate command) in the altitude control rule in FIG. 3 is made constant. Further, the altitude change rate command is integrated by the integrator shown in FIG. 3 to calculate an altitude command, and the initial value of the integrator is the safe altitude (several 10 cm).

As the altitude control program is executed, the airframe is climbed to a predetermined target climb altitude. (See FIG. 4.) The target climb altitude can be set appropriately in response to the flight pattern. The step of climbing the airframe to the target climb altitude by executing the altitude control program is a second climbing step in the invention. When the airframe is climbed from the safe altitude to the target climb altitude, position control is performed so as to hold the horizontal position of the airframe at the point in time when the takeoff start command is received.

If the airframe arrives at the target climb altitude as the altitude control program is executed, the helicopter hovers for a given time and then starts an autonomous flight according to the flight pattern data previously stored in the memory of the flight controller 21.

<Automatic Landing Control>

Next, the automatic landing control will be discussed. A landing control program for accomplishing predetermined landing operation is stored in the memory of the flight controller 21. After the termination of autonomous flight according to the predetermined flight pattern data, the arithmetic processing circuit of the flight controller 21 causes the aircraft to hover over a predetermined landing target point for a given time and then executes the landing control program.

The landing control program causes the airframe to descend from the hovering altitude while stepwise decreasing the altitude change rate with lowering of the airframe altitude. Specifically, as the landing control program is executed, a descent rate command (altitude change rate command) in the altitude control shown in FIG. 3 is stepwise decreased with lowering of the airframe altitude. (See FIG. 5.) The mode of change in the descent rate command with lowering of the airframe altitude can be determined appropriately in response to the airframe weight and the weather conditions. In the embodiment, the descent rate command is smoothly changed by a rate limiter. The descent rate command is integrated by the integrator shown in FIG. 3 to calculate an altitude command.

In the embodiment, as the landing control program is executed, the airframe is caused to descend while the descent rate command is decreased from the hovering altitude to the target descent altitude. (See FIG. 5.) This step is a first descent step in the invention and the target descent altitude is a second altitude in the invention. As the landing control program is executed, the airframe is caused to descend at a descent rate smaller than the descent rate in the first descent step from the target descent altitude to the ground. This step is a second descent step in the invention. As the landing control program is executed, the descending speed at the landing time can be lessened sufficiently. Consequently, safety at the landing time can be ensured.

In the first descent step and the second descent step, the arithmetic processing circuit of the flight controller 21 also executes the position control program and the attitude control program during execution of the landing control program for performing the position control and the attitude control. As the position control and the attitude control are performed, the airframe can be caused to descend toward the landing target position.

If the fact that the airframe descends and arrives at the target descent altitude is measured by the airframe GPS receiver 22, the landing control program temporarily suppresses processing of the position control program and the attitude control program from the target descent altitude arrival point in time to the landing point in time. Specifically, as the landing control program is executed, the integrator (not shown) in the position control rule in FIG. 3 is fixed and the integrator (not shown) in the attitude control rule in FIG. 3 is also fixed from the target descent altitude arrival point in time to the landing point in time. That is, outputs of the integrators (not shown) are set to constant values.

As the landing control program is executed, processing of the position control program and the attitude control program is temporarily suppressed from the target descent altitude arrival point in time to the landing point in time. Thus, if the airframe is restrained by the friction between the airframe and the ground just before landing and cannot follow the attitude angle command, an excessive control command can be prevented from being output for causing the airframe to topple over.

The landing control program and the arithmetic processing circuit of the flight controller 21 described above provide descent device in the invention.

A landing determination program for accomplishing predetermined landing determination processing when the helicopter arrives at the target descent altitude is stored in the memory of the flight controller 21. When the arithmetic processing circuit of the flight controller 21 executes the landing determination program, whether or not the helicopter lands can be determined by the collective pitch blade angle command calculated by executing the altitude control program.

A landing determination technique of the landing determination program will be discussed specifically. In the altitude control program, the altitude change rate command (descent rate command) is integrated by the integrator shown in FIG. 3, thereby calculating an altitude command. Thus, the altitude command gradually decreases and shifts from a positive value (namely, ground) to a negative value (namely, underground) In contrast, when the airframe lands, the fed-back altitude data remains zero and does not change.

Consequently, the deviation between the fed-back altitude data and the altitude command value gradually grows in the negative direction and therefore the value of the collective pitch blade angle command output to correct the deviation in the negative direction gradually lessens and soon becomes 0 degrees. The landing determination program monitors the collective pitch blade angle command and if the collective pitch blade angle command of a predetermined value or less continues for a predetermined time, the landing determination program determines that the helicopter lands.

Hitherto, a technique of detecting the airframe landing based on inertial sensor output of shock at the touchdown time or a technique of detecting the airframe landing by an electric switch installed in a foot is adopted; however, an erroneous determination of landing although the helicopter is still flying may be made according to the techniques in the related arts. In contrast, in the embodiment, the landing determination program is executed and monitors the collective pitch blade angle command, thereby determining whether or not the helicopter lands. Thus, an erroneous determination of landing can be prevented and safe landing operation can be ensured.

The landing determination program and the arithmetic processing circuit of the flight controller 21 described above provide landing determination device in the invention.

Next, the operation of the operator to accomplish the automatic takeoff and landing control operation of the flight control system 1 according to the embodiment will be discussed.

<At Takeoff Time>

To begin with, the operator installs an antenna of the base station GPS receiver 11 at a point whose accurate coordinates are known (already known coordinate point). Next, the operator turns on power of the base station GPS receiver 11, the PC 12, and the base station radio transmission unit 13 and then enters the coordinates of the already known coordinate point in the base station GPS receiver 11 and starts GPS computation. Subsequently, the operator starts to transmit differential information by the base station radio transmission unit 13.

Then, the operator installs the unmanned helicopter 20 at a predetermined takeoff point. Next, the operator operates a predetermined switch installed in the airframe of the helicopter 20 to turn on power of installed machines. The operator waits until differential information data transmission is established between the airframe GPS receiver 22 and the base station GPS receiver 11 and GPS computation is started in the airframe GPS receiver 22. Aside from the described operation, the operator starts the engine 27 of the unmanned helicopter 20 and warms up the engine 27 as required. Subsequently, the operator enters a takeoff start command by operating a switch of the radio control apparatus 14. As the described operation is performed, the automatic takeoff control operation described above is accomplished by the flight controller 21 of the unmanned helicopter 20.

<At Landing Time>

Since the automatic landing control operation described above is accomplished by the flight controller 21 of the unmanned helicopter 20, the operator need not perform any operation until completion of landing of the airframe. After completion of landing of the airframe, the operator checks engine sound, warning light indication, and the like to ensure that the engine 27 enters an idle state, and enters an engine stop command by operating a switch of the radio control apparatus 14. After the rotor 28 of the unmanned helicopter 20 stops, the operator operates a predetermined switch installed in the airframe to shut off the power of the installed machines. After this, the operator shuts off the power of the machines in the base station 10 (base station GPS receiver 11, PC 12, and base station radio transmission unit 13).

The unmanned helicopter 20 in the flight control system 1 according to the embodiment includes the landing determination device (landing determination program and arithmetic processing circuit) for determining whether or not the helicopter lands based on the collective pitch blade angle command, so that an erroneous determination of landing can be prevented and safe landing operation can be ensured.

Upon reception of the takeoff start command from the radio control apparatus 14, the takeoff device (takeoff control program and arithmetic processing circuit) temporarily suppresses the position control and the attitude control. Thus, a situation in which an excessive control command is output for causing the airframe to topple over, etc., if the airframe is restrained by the friction between the foot and the ground in the touchdown state and cannot follow the attitude angle command can be prevented from occurring.

The unmanned helicopter 20 in the flight control system 1 according to the embodiment includes the descending device (landing control program and arithmetic processing circuit) for causing the airframe to descend from the hovering altitude while stepwise decreasing the descent rate command with lowering of the airframe altitude, so that the descending speed at the landing time can be sufficiently lessened while the required time from start of descent to landing is shortened as much as possible. Consequently, safety at the landing time can be ensured.

The descending device (landing control program and arithmetic processing circuit) temporarily suppresses the position control and the attitude control from the target descent altitude arrival point in time to the landing point in time. Thus, if the airframe is restrained by the friction between the airframe and the ground just before landing and cannot follow the attitude angle command, an excessive control command can be prevented from being output for causing the airframe to topple over.

The unmanned helicopter 20 in the flight control system 1 according to the embodiment includes the landing determination device (landing determination program and arithmetic processing circuit) for determining whether or not the helicopter lands based on the collective pitch rudder angle command, so that an erroneous determination of landing can be prevented and safe landing operation can be ensured.

Moreover, the takeoff control program and the landing control program installed in the unmanned helicopter 20 control the operation timings of the altitude control program, the position control program, and the attitude control program used previously and the behavior of the integrators, so that the software configuration is comparatively simple. Special high-accurate sensors for measuring the altitude and the descending speed in the proximity of the ground need not be installed in the airframe and a commercially available general-purpose differential GPS can be installed for controlling the descending speed at the landing time to sufficiently small speed. Consequently, an increase in the airframe price can be suppressed.

According to the invention as in the first aspect, the takeoff device causes the airframe to take off and climbs the airframe to the first altitude while increasing the collective pitch blade angle without performing the altitude control, so that the airframe can be promptly brought away from the ground. Consequently, safety at the takeoff time can be ensured. Since the takeoff device controls the operation timing of the altitude control device used previously, the software configuration is comparatively simple. Consequently, an increase in the airframe price can be suppressed.

According to the invention as in the second aspect, the takeoff device suppresses the position control and the attitude control when climbing the airframe to the first altitude. Thus, an excessive control command is not output with the airframe restrained in the touchdown state, so that the airframe can be prevented from toppling over, etc.

According to the invention as in the third aspect, the descending device causes the airframe to descend to the second altitude while changing the descent rate and causes the airframe to descend from the second altitude to the ground at a descent rate smaller than the descent rate to the second altitude, so that the descending speed at the landing time can be lessened sufficiently. Consequently, safety at the landing time can be ensured. Since the descending device performs control related to the descent rate command of the altitude control device used previously, the software configuration is comparatively simple. Special high-accurate sensors for measuring the altitude and the descending speed in the proximity of the ground need not be installed in the airframe and a commercially available general-purpose differential GPS can be installed for controlling the descending speed at the landing time to sufficiently small speed. Consequently, an increase in the airframe price can be suppressed.

According to the invention as in the forth aspect, the descending device suppresses the position control and the attitude control when causing the airframe to descend from the second altitude to the ground. Thus, an excessive control command is not output with the airframe restrained after landing, so that the airframe can be prevented from toppling over, etc.

According to the invention as in the fifth aspect, the landing determination device determines that the airframe lands if the blade angle command of a predetermined value or less continues for a predetermined time, so that an erroneous determination of landing can be prevented and safe landing operation can be ensured.

According to the invention as in the sixth aspect, the takeoff method includes the first climbing step of climbing to the first altitude while increasing the climb rate without performing altitude control, so that the airframe is promptly brought away from the ground, and safety at the takeoff time can be ensured.

According to the invention as in the seventh aspect, when the airframe climbs to the first altitude, position control of the airframe on the horizontal plane and attitude control of the airframe are suppressed. Thus, an excessive control command is not output with the airframe restrained in the touchdown state, so that the airframe can be prevented from toppling over, etc.

According to the invention as in the eighth aspect, the landing method includes the first descending step of stepwise decreasing the descent rate and descending to the second altitude; and the second descending step of descending from the second altitude to the ground at a descent rate smaller than the descent rate in the first step, so that the descending speed at the landing time can be lessened sufficiently. Consequently, safety at the landing time can be ensured.

According to the invention as in the ninth aspect, when the airframe descends from the second altitude to the ground, position control of the airframe on the horizontal plane and attitude control are suppressed. Thus, an excessive control command is not output with the airframe restrained after landing, so that the airframe can be prevented from toppling over, etc.

According to the invention as in the tenth aspect, the collective pitch blade angle is changed based on the blade angle command calculated based on the deviation between the fed-back altitude and the altitude command and the like, descending is performed, and if the blade angle command of a predetermined value or less continues for a predetermined time, it is determined that the helicopter lands. Thus, an erroneous determination of landing can be prevented and safe landing operation can be ensured.

What is claimed is:

1. An unmanned helicopter for making a flight autonomously,
the unmanned helicopter comprising:
   altitude control device for giving a command of a collective pitch blade angle based on the deviation between a fed-back altitude and an altitude command and the deviation between a fed-back climb rate and a climb rate command;
   position control device for performing position control based on the deviation between a fed-back position and a position command with respect to a horizontal position and the deviation between fed-back speed and a speed command;
   attitude control device for performing attitude control of an airframe based on the deviation between a fed-back attitude angle and an attitude angle command; and
   takeoff device, upon reception of a takeoff start command from the ground, for causing the airframe to take off and climbing the airframe to a first altitude while increasing the collective pitch blade angle without performing the altitude control of the altitude control device and then causing the altitude control device to start the altitude control.

2. The unmanned helicopter as in claim 1, wherein the takeoff device suppresses the position control and the attitude control, when climbing the airframe to the first altitude.

3. An unmanned helicopter for making a flight autonomously,
the unmanned helicopter comprising:
   altitude control device for controlling a collective pitch blade angle based on a blade angle command calculated based on the deviation between a fed-back altitude and an altitude command and the deviation between a fed-back descent rate and a descent rate command;
   position control device for performing position control based on the deviation between a fed-back position and a position command with respect to a horizontal position and the deviation between fed-back speed and a speed command;
   attitude control device for performing attitude control of an airframe based on the deviation between a fed-back attitude angle and an attitude angle command; and
   descending device for stepwise changing descent rate command of the altitude control device for causing the airframe to descend to a second altitude and giving a descent rate command smaller than the descent rate command to the second altitude to the altitude control device for causing the airframe to descend from the second altitude to the ground.

4. The unmanned helicopter as in claim 3, wherein the takeoff device suppresses the position control and the attitude control, when causing the airframe to descend from the second altitude to the ground.

5. The unmanned helicopter as in claim 3, further comprising:
    landing determination device for determining that the airframe lands if the blade angle command which is less than a predetermined value continues for a predetermined time.

6. A landing method of an unmanned helicopter comprising:
    changing a collective pitch blade angle based on a blade angle command calculated based on the deviation between a fed-back altitude and an altitude command and the deviation between a fed-back altitude change rate and an altitude change rate command,
    descending, and
    determining that the helicopter lands, if the blade angle command of a predetermined value or less continues for a predetermined time.

7. An autonomous takeoff method of an unmanned helicopter comprising:
    a first climbing step of climbing to a first altitude while increasing a climb rate by increasing a collective pitch blade angle command at a constant rate; and
    a second climbing step of climbing while performing altitude control from the first altitude,
    wherein the helicopter is autonomously controlled for takeoff,
    wherein the second climbing step is performed according to a fed back control based on a deviation between a fed-back altitude and an altitude command and a deviation between a fed-back altitude change rate and an altitude change rate command.

8. An autonomous landing method of an unmanned helicopter comprising:
    a first descending step of stepwise decreasing a descent rate and descending to a second altitude; and
    a second descending step of descending from the second altitude to the ground at a descent rate smaller than the descent rate in the first step,
    wherein the helicopter is autonomously controlled for descending to the ground,
    wherein the second descending step comprises the step of changing a collective pitch blade angle according to a fed back control based on a deviation between a fed-back altitude and an altitude command and a deviation between a fed-back altitude change rate and an altitude change rate command.

9. The takeoff method of an unmanned helicopter as in claim 7, wherein position control of an airframe on a horizontal plane and attitude control of the airframe are suppressed in the first climbing step.

10. The landing method of an unmanned helicopter as in claim 8, wherein
    position control of an airframe on a horizontal plane and attitude control of the airframe are suppressed in the second descending step.

11. The takeoff method of an unmanned helicopter as in claim 7, further comprising a hovering step of hovering at a target climb altitude reached in said second climbing step.

* * * * *